INJECTION TYPE QUATERNARY COMPOUND LIGHT EMITTING DIOXIDE

Filed Dec. 21, 1970

INVENTORS

KAZUHIRO KURATA, HIROYUKI KASANO,
MASAHIKO OGIRIMA, HAZIME KUSUMOTO
AND TOSHIMITU SHINODA

BY Craig, Antonelli, Stewart & Hill
ATTORNEYS

INVENTORS

KAZUHIRO KURATA, HIROYUKI KASANO,
MASAHIKO OGIRIMA, HAZIME KUSUMOTO,
AND TOSHIMITU SHINODA

BY Craig, Antonelli, Stewart & Hill

ATTORNEYS

April 2, 1974 KAZUHIRO KURATA ET AL 3,801,509

INJECTION TYPE QUATERNARY COMPOUND LIGHT EMITTING DIOXIDE

Filed Dec. 21, 1970 4 Sheets-Sheet 3

INVENTORS
KAZUHIRO KURATA, HIROYUKI KASANO
MASAHIKO OGIRIMA, HAZIME KUSUMOTO,
AND TOSHIMITU SHINODA
BY Craig, Antonelli, Stewart & Hill
ATTORNEYS

INVENTORS

KAZUHIRO KURATA, HIROYUKI KASANO, MASAHIKO OGIRIMA, HAZIME KUSUMOTO, AND TOSHIMITU SHINODA

BY Craig, Antonelli, Stewart & Hill

ATTORNEYS 3,801,509

INJECTION TYPE QUATERNARY COMPOUND LIGHT EMITTING DIODE

Kazuhiro Kurata, Hachioji, Hiroyuki Kasano, Akishima, and Masahiko Ogirima, Hazime Kusumoto, and Toshimitu Shinoda, Tokyo, Japan, assignors to Hitachi, Ltd., Tokyo, Japan Filed Dec. 21, 1970, Ser. No. 99,873
Claims priority, application Japan, Dec. 22, 1969, 44/102,498
Int. Cl. H01l 3/20
U.S. Cl. 252—62.36 A 7 Claims

ABSTRACT OF THE DISCLOSURE

An injection type light emitting diode made of a quaternary solid solution of $Ga_{1-x}Al_xAs_{1-y}P_y$ type, where $0<x<1$ and $0<y<1$. In the conventional light emitting diode made of a $G_aAl_{1-x}P_x$ or $Ga_{1-x}Al_xAs(0<x<1)$ type solid solution, the mole fraction $x$ which makes the solid solution of the direct energy band gap type is 0.4 and 0.2 or less, respectively, and the emission peak is at a wavelength longer than 6700 A. and 7000 A., respectively. The emission peak of the diode according to the present invention is at a shorter wavelength than that of the conventional one, and yet the quantum efficiency of the diode according to the present invention is higher than that of the conventional one.

BACKGROUND OF THE INVENTION

Field of the invention

The present invention relates to a light emitting diode and a method of manufacturing the same, and more particularly to an injection type light emitting diode made of $GaAs_{1-x}P_x(0<x<1)$ and $Ga_{1-x}Al_xAs(0<x<1)$ group mixed crystals.

Description of the prior art

An injection type light emitting diode emits light by the recombination of electrons or holes injected therein when a forward bias voltage is applied to the p-n junction of the diode with holes or electrons, respectively, which are majority carriers and which have existed in the diode. When p- and n-type semiconductor bodies are joined together, electrons existing in the p-type body flow into the n-type body, and at the same time holes existing in the n-type body flow into the p-type body to vary the energy level of the assembly, whereby a potential barrier which impedes the flow of electrons and holes is formed at the junction portion of the p- and n-type semiconductor bodies. If a voltage which makes the n-type body negative and makes the p-type body positive, i.e. a forward voltage is applied to the assembly or diode, the energy level of the diode again varies to reduce the height of the potential barrier. Consequently, electrons flow from the n-type region into the p-type region and holes flow from the p-type region into the n-type region, and hence a high current flows through the junction. The electrons flowing into the p-type region recombine with holes therein and the holes flowing into the n-type region recombine with electrons in the conduction band in the n-type region. In this case, the transition of the electrons from the conduction band to the valence band due to the recombination with the holes is accompanied by photon emission.

There are two kinds of transitions of electrons from the conduction band to the valence band, the direct energy band gap type and the indirect energy band gap type. The direct energy band gap type is such that when the energy of an electron is expressed as a function of the wave vector $k$, the electron can perform a transition between the bottom of the conduction band and the top of the valence band without a change of the wave vector $k$, while the indirect energy band gap type is such that the transition of an electron occurs with a change in the wave vector $k$ emitting a photon corresponding thereto, the transition probability of the indirect energy band gap type transition is lower than that of the direct energy band gap type transition and hence, the intensity of light emission is far lower. Examples of direct energy band gap type materials are GaAs, GaSb, InSb, InAs and InP, and examples of indirect energy band gap type materials are III*b*–V*b* compound semiconductors such as GaP.

Generally, materials such as GaP (band gap energy: 2.24 ev.) having a band gap energy larger than GaAs (band gap energy: 1.38 ev.) have the indirect energy band gap structure, so that light emission of a high quantum efficience is impossible. Moreover, since the peak energy of emitted photons cannot exceed the forbidden band gap in principle, it is difficult to emit, with a high efficiency, light in the short wave regions, in particular in the visible region.

In order to obviate these disadvantages recently some light emitting diodes in the visible region have been proposed which are made of a solid solution of compound semiconductors of direct and indirect energy band gap types. Some of these are so-called $GaAs_{1-x}P_x$ group mixed crystals which are solid solutions of GaAs, a direct energy band gap type compound semiconductor, and GaP, an indirect energy band gap type compound semiconductor, and $Ga_{1-x}Al_xAs$ group mixed crystals which are solid solutions of GaAs and AlAs. It is known that the composition range of these mixed crystals in which these mixed crystals have the direct band structure is that the mixture ratio or mole fraction $x$ is about 0.4 or less for $GaAs_{1-x}P_x$ group mixed crystals and about 0.2 or less for $Ga_{1-x}Al_xAs$ group mixed crystals. These mixed crystals have a high quantum efficiency in the visible region. The wavelengths at which light emission of these crystals shows a maximum intensity are longer than about 6700 A. and 7000 A., respectively. On the other hand, the maximum human visibility is at about 5500 A. Consequently, the visibility becomes higher from the above-mentioned wavelengths of the maximum intensity light emission towards shorter wavelengths, the rate of the increase in the visibility being about 10 times at each decrease by 500 A.

Thus, it is desirable for light emission of a high efficiency by these kinds of light emitting elements to employ crystals of those materials which have as wide a forbidden band gap as possible and a direct energy band gap structure.

However, in the above-mentioned two kinds of groups of mixed crystals, $GaAs_{1-x}P_x$ and $Ga_{1-x}Al_xAs$, the wavelength of emitted light becomes shorter if the mole fraction $x$ is made larger than the above-mentioned values, about 0.4 for $GaAs_{1-x}P_x$ and about 0.2 for $Ga_{1-x}Al_xAs$, but the quantum efficiency rapidly falls. For example, the limit of the external quantum efficiency is 0.5% at a maximum wavelength of about 6800 A. for $GaAs_{1-x}P_x$ and 2.5% at a maximum wavelength of about 7200 A. for $Ga_{1-x}Al_xAs$.

SUMMARY OF THE INVENTION

An object of the present invention is to provide an injection type light emitting element made of a mixed crystal having a novel composition which can emit light having a maximum intensity at a shorter wavelength or a wavelength nearer to the maximum visibility with less reduction of the quantum efficiency than those of $GaAs_{1-x}P_x$ and $Ga_{1-x}Al_xAs$ group mixed crystals.

Another object of the present invention is to provide a method of manufacturing the above-mentioned light emitting element.

DESCRIPTION OF THE PREFERRED EMBODIMENTS

Figure 1A:
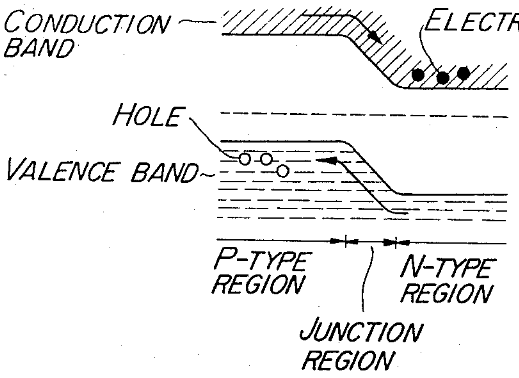
FIGS. 1a and 1b are energy level diagrams of a p-n junction element free from a bias voltage and with a forward bias voltage applied thereto, respectively.
Figure 1B:
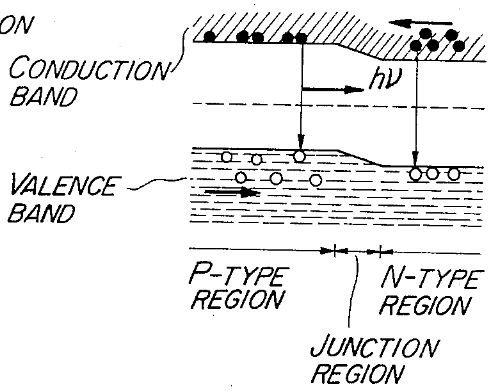

FIGS. 1a and 1b, which show energy levels of a light emitting diode when no bias voltage is applied thereto and when a forward bias voltage is applied thereto, respectively, explain the principle on which the diode emits light. When a forward bias voltage is applied to the diode, the energy levels of the diode change from those shown in FIG. 1a to those shown in FIG. 1b. Thus, the height of the potential barrier is reduced to enable a high current to flow through the junction part to emit light.

Figure 2A:
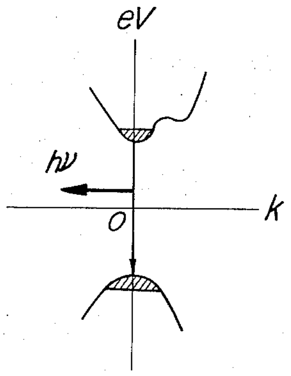
FIGS. 2a and 2b are energy band structures of direct energy band gap type and indirect energy band gap type semiconductors, respectively, in the wave vector ($k$) space.
Figure 2B:
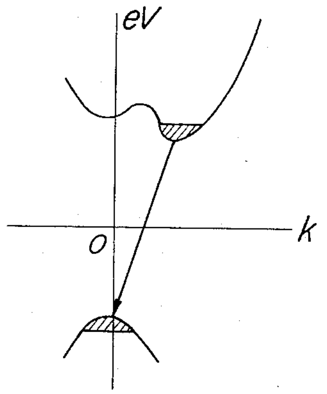

FIGS. 2a and 2b show two kinds of band structures in the wave vector ($k$) space representation. In a semiconductor material having the direct energy band gap type structure as shown in FIG. 2a the light emitting transition of an electron occurs directly from the bottom of the conduction band to the top of the valence band, while in a semiconductor material having the indirect energy band gap type structure as shown in FIG. 2b the transition of an electron from the conduction band to the valence band occurs by way of the interaction with a lattice vibration emitting a phonon.

The injection type light emitting diode according to the present invention is made of a direct energy band gap type mixed crystal having a composition of $$Ga_{1-x}Al_xAs_{1-y}P_y$$

Examples of manufacturing method of the light emitting diode according to the present invention will now be described with reference to FIGS. 3a, 3b, 4a, and 4b of the drawing.

Figure 3A:
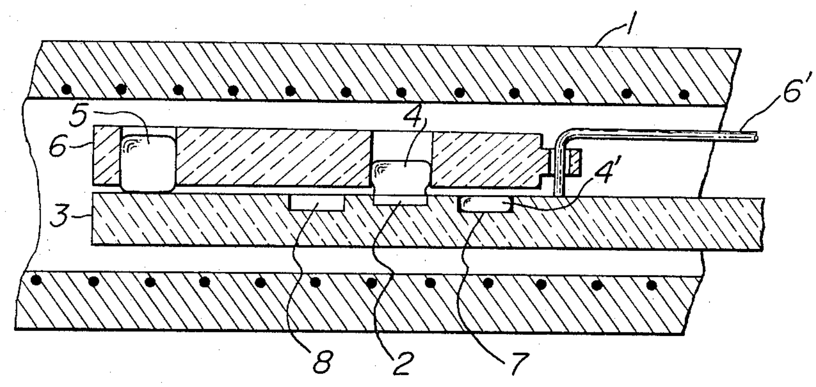
FIGS. 3a and 3b are cross-sectional views of a main part of a furnace for use in manufacturing a base crystal for the injection type light emitting diode and a p-n junction according to the present invention at two stages of of the manufacturing process.

Referring first to FIG. 3a, a support 3 made of graphite, alumina or boron nitride holding a GaAs crystal substrate 2 and a similar support 6 holding melts 4 and 5 from which n- and p-type semiconductor mixed crystals are to be crystallized, respectively, are inserted in an electric resistance furnace 1. The melts 4 and 5 are maintained at a temperature of about 1000° C. in an atmosphere of hydrogen or inert gas such as argon. The support 6 is slidably displaced by means of a quartz rod 6' fixed to the support 6 from the right to the left on the support 3 so that the melt 4 may first be contacted to the GaAs substrate 2 as shown in FIG. 3a. During this operation a bottom part 4' of the melt 4 is trapped in a recess 7 formed in the support 3 so that a fresh surface of the melt 4 is brought into contact with the GaAs substrate 2. Consequently, wetting between the substrate 2 and the melt 4 is good.

Figure 3B:
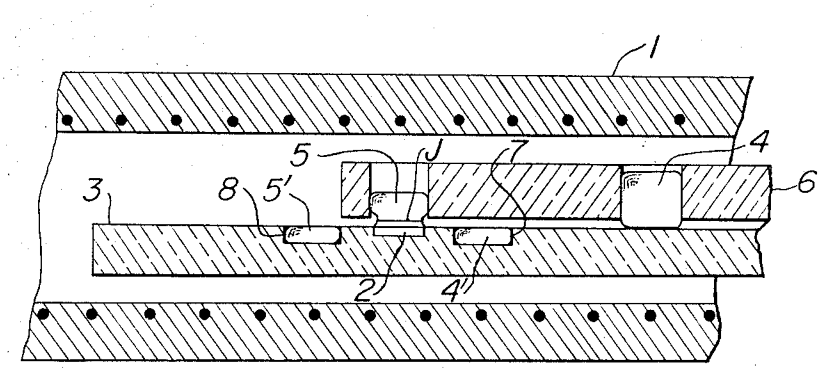

Then the temperature of the melt 4 is cooled at a rate of 1 to 5° C./min. by adjusting the power input to the electric furnace 1 to epitaxially grow an n-type mixed crystal layer on the GaAs substrate 2. When the temperature of the melt 4 has fallen to 900° C. the support 6 is moved in the right-hand direction to bring the melt 5 into contact with the grown n-type mixed crystal layer as shown in FIG. 3b. Then the melt 5 is cooled so that a p-type mixed crystal layer is grown on the previously grown n-type mixed crystal layer to form a p-n junction J therebetween. In this case also, a bottom part 5' of the melt 5 is trapped in a recess 8 also formed in the support 3 to expose a fresh surface of the melt 5 for good wetting between the melt 5 and the n-type layer grown on the substrate 2.

The melts 4 and 5 are prepared in the following manner. Chips of GaAs, GaP and Al are mixed in chips of Ga which acts as a solvent and the mixture is heated to a high temperature to be molten. To obtain the n-type melt 4, the molten mixture is doped with a donor impurity such as Te, Se or Sn, and to obtain the p-type melt 5, the molten mixture is doped with an acceptor impurity such as Zn or Cd. The doping level of these impurities is usually less than about 0.2 atomic percent relative to the solvent Ga. However, the doping level varies depending on the purity of Ga, GaAs, GaP and Al employed. The doping level is so controlled that the carrier concentration in the mixed crystal crystallized from the melt becomes $10^{16}$ to $10^{18}$/cm.$^3$. A suitable amount of GaAs to be mixed in the solvent Ga is about 10 to 20 percent by weight relative to the amount of the solvent Ga. This amount is such an amount that, the whole of the amount of GaAs does not dissolve into the solvent Ga even if the melt 4 or 5 is heated to about 1000° C., but a small amount of GaAs corresponding to supersaturation at that temperature remains in the solid state. Similar conditions also apply for GaP. A suitable amount of GaP at about 1000° C. is about 0.5 to 0.6 percent by weight. However, when the melt 4 or 5 is heated to a temperature higher than 1000° C., the amount of each of GaAs and GaP is increased, and if the temperature of the melt 4 or 5 is lower than 1000° C., the amount of GaAs and GaP is reduced. In any case, the amount of GaAs or GaP is such that the melt 4 or 5 is more or less supersaturated at its maintained temperature.

In contradistinction, the amount of Al to be incorporated in the melt 4 or 5 directly exerts an influence on the quantum efficiency and the wavelength of emitted light, and hence is limited. For example, a suitable amount of aluminum is 1 to 3 atomic percent relative to the amount of the solvent Ga when the melt 4 or 5 is maintained at about 1000° C. When the melt 4 or 5 is maintained at about 1200° C., a suitable amount of aluminum is 0.5 to 2 atomic percent, and when the melt 4 or 5 is maintained at about 800° C., a suitable amount of aluminum is 1.5 to 4 atomic percent. Consequently, the range of the amount of aluminum employed in the present invention is restricted to from 0.5 to 4 atomic percent relative to the amount of the solvent Ga.

In the above example, n-type GaAs doped with Te was employed as the crystal substrate 2. If p-type GaAs is employed as the crystalline substrate 2, a p-type mixed crystal or solid solution layer may first be crystallized, and then an n-type solid solution layer may be superimposed thereon. It is also possible to employ conventional methods such as a titling boat technique, vertical dipping technique and the like as the liquid phase growth method. In any case, the essential requisite is that GaAs is employed as the crystalline substrate 2 and gallium solutions are employed as the melts 4 and 5 which are supersaturated with GaAs and GaP, respectively, at a temperature of from 800° C. to 1200° C., one of which contains aluminum in an amount of 0.5 to 4 atomic percent relative to the amount of the solvent Ga, and which are doped with Te, Sn or Se as a donor impurity and Zn or Cd as an acceptor impurity, respectively.

As the fabrication method of the p-n junction an impurity such as Zn or Cd may be diffused, for example, into an n-type solid solution layer instead of the fabrication of the grown junction as in the above example.

It has been found as a result of analyses by means of an X-ray micro-analyzer that the mole fractions $x$ and $y$ of the solid solution layers manufactured in the above-mentioned manner which have the chemical composition generally expressed by $Ga_{1-x}Al_xAs_{1-y}P_y$ are in the ranges of $$x=0.05\text{–}0.25$$
$$y=0.05\text{–}0.10$$

In this case the value of the mole fraction $x$ varies mainly depending on the amount of aluminum incorporated in the melt 4 or 5, and the value of the mole fraction $y$ varies mainly depending on the temperature at the time of bringing the melt 4 or 5 in contact with the crystal substrate 2.

Figure 4A:
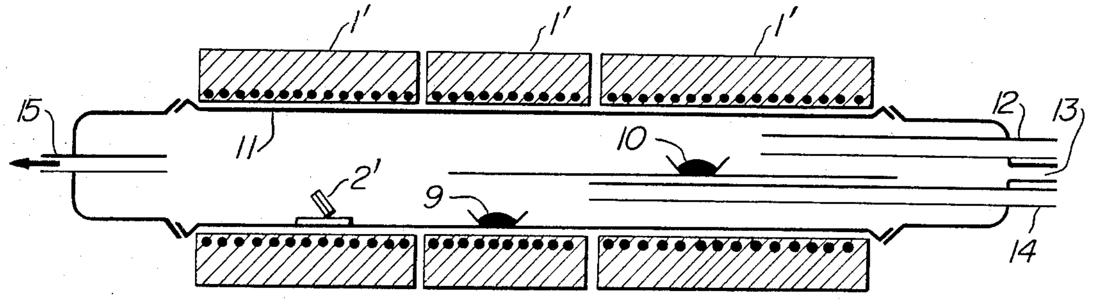
FIGS. 4a and 4b show a cross-section of a main part of another furnace for use in manufacturing a base crystal for the injection type light emitting diode according to the present invention and the temperature distribution in the furnace.
Figure 4B:
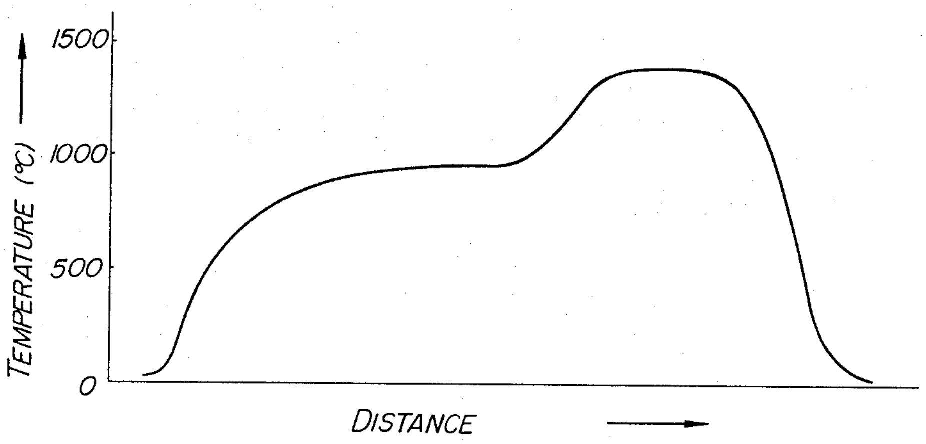

In order to study the properties of mixed crystals or solids solutions having the values of the mole fractions $x$ and $y$ outside the above-mentioned ranges, sample crystals were produced by the use of a vapor phase epitaxial growth furnace as shown in FIG. 4(a). In a reaction tube 11 made of fused alumina disposed in an electric furnace 1' a GaAs crystal substrate 2', an amount of gallium 9 placed in a graphite boat and an amount of aluminum 10 also placed in a graphite boat are arranged as shown. The temperature distribution in the furnace 1' is as shown in FIG. 4(b). The air in the reaction tube 11 is completely replaced by hydrogen gas. Then, HCl vapor, a gas mixture of $PH_3$-$AsH_3$, and HCl vapor are led into the reaction tube 11 through intake tubes 12, 13 and 14, respectively, each made of fused alumina similarly to the reaction tube 11. In this case, hydrogen gas is employed as a carrier gas. The mole fraction $x$ of the mixed crystal $Ga_{1-x}Al_xAs_{1-y}P_y$ epitaxially growing of the crystal substrate 2 varies depending on the ratio between HCl vapors flowing into the reaction tube 11 through the intake tubes 12 and 14, while the mole fraction $y$ varies depending on the mixture ratio of $PH_3$ and $AsH_3$ flowing into the reaction tube 11 through the intake tube 13.

In case the temperature distribution in the tube 11 which has an inner diameter of about 35 mm. is as shown in FIG. 4(b) and the temperature gradient in the vicinity of the crystal substrate 2 is about 10° C./cm., a good quality epitaxially grown layer of the mixed crystal can be obtained when the total flow rate of hydrogen containing 20% of HCl flowing into the reaction tube 11 through the intake tubes 12 and 14 is 20 to 50 cc./min. and the flow rate of hydrogen containing 3% of $PH_3$ and 3% of $AsH_3$ through the intake tube 13 is 100 cc./min. If it is desired to obtain an n-type grown mixed crystal layer, a slight amount of $H_2S$, $H_2Se$ or $H_2Te$ is mixed in the gas mixture of $PH_3$ and $AsH_3$ which is led through the intake tube 13.

The ranges of the mole fractions $x$ and $y$ of the $Ga_{1-x}Al_xAs_{1-y}P_y$ type mixed crystals produced by the above-described vapor phase epitaxial growth method are $x=0\text{–}1$ and $y=0\text{–}1$. Injection type light emitting diodes were manufactured by diffusing zinc into the thus produced n-type mixed crystal layers in a quartz ampoule to form p-n junctions therein. From the measurements of the intensity distribution of spectra with respect to the wavelength of the thus formed injection type light emitting diodes to which a forward bias voltage is applied to allow currents to flow therethrough the composition ratio of the mixed crystal which meets the purpose of the present invention has been determined. The following Table I shows the mole fractions $x$ and $y$ measured by means of an X-ray micro-analyzer, and the maximum intensity wavelengths and half-widths of the emitted light and the relative intensities of the light emission with respect to the mole fractions $x$ and $y$. The values of the relative intensity of the light emission were measured under such condition that the area of the p-n junction and the forward current flowing therethrough were made constant at 0.25 mm.$^2$ and 15 ma., respectively.

TABLE I

| Mole fraction $x$ | Mole fraction $y$ | Maximum intensity wavelength (A.) | Half-width (A.) | Relative intensity (arbitrary unit) |
|---|---|---|---|---|
| 0.1 | 0.0 | 7,820 | 240 | 95 |
| 0.05 | 0.25 | 7,000 | 200 | 80 |
| 0.15 | 0.0 | 7,600 | 245 | 95 |
| 0.20 | 0.0 | 7,000 | 210 | 48 |
| 0.31 | 0.0 | 6,400 | 950 | 5 |
| 0.33 | 0.0 | 6,250 | 1,050 | 4 |
| 0.0 | 0.1 | 7,900 | 300 | 85 |
| 0.0 | 0.12 | 7,800 | 250 | 80 |
| 0.0 | 0.20 | 7,100 | 210 | 90 |
| 0.0 | 0.40 | 6,300 | 250 | 68 |
| 0.0 | 0.45 | 6,000 | 1,010 | 5 |
| 0.0 | 0.50 | 6,000 | 1,200 | 4 |
| 0.1 | 0.05 | 7,700 | 200 | 80 |
| 0.1 | 0.1 | 7,500 | 220 | 95 |
| 0.2 | 0.1 | 6,300 | 200 | 88 |
| 0.2 | 0.2 | 6,100 | 1,200 | 6 |
| 0.3 | 0.05 | 6,150 | 1,200 | 4 |
| 0.32 | 0.05 | 6,300 | 1,000 | 5 |
| 0.15 | 0.20 | 6,300 | 250 | 70 |
| 0.1 | 0.30 | 6,050 | 300 | 65 |
| 0.15 | 0.25 | 5,900 | 1,550 | 3 |
| 0.05 | 0.05 | 8,700 | 200 | 95 |
| 0.1 | 0.4 | 6,100 | 1,100 | 5 |

Figure 5:
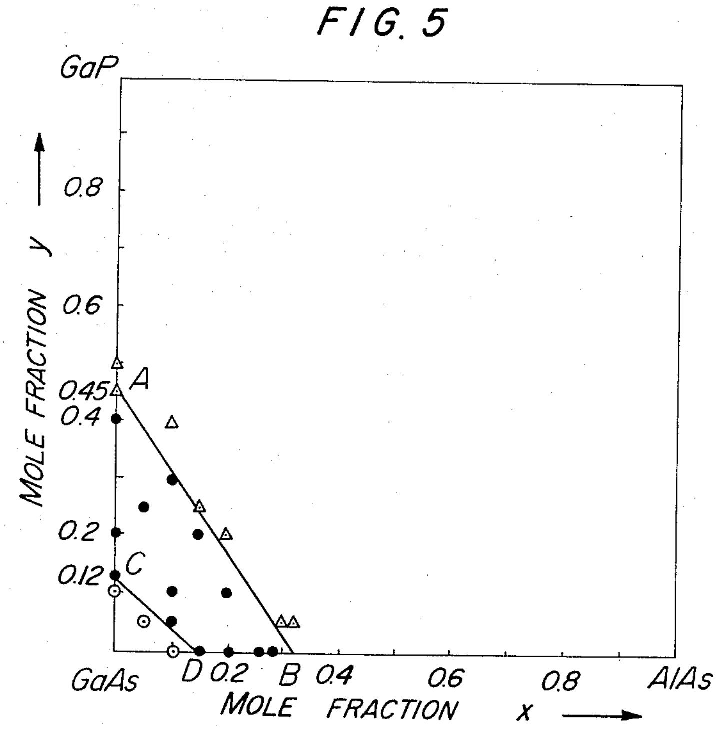
FIG. 5 is a diagram showing the composition ranges of the base crystal for the injection type light emitting diode according to the present invention.

Injection type light emitting diodes which have maximum intensity wavelengths of emitted light longer than 7800 A. cannot be used as visible light emitting elements because they fall in the region of infrared rays. Those having half-widths longer than 600 to 700 A. and low relative intensities of light emission are of the indirect energy band gap type, and markedly lower in the quantum efficiency than direct energy band gap type elements which have half-widths shorter than 300 to 400 A. and high relative intensities. FIG. 5 shows a plot of the mole fractions $x$ and $y$ on the X–Y plane. White circles indicate the compositions which emit infrared rays, black circles indicate the direct gap type energy band structure compositions which emit visible light rays, and triangles indicate the compositions which have the indirect gap type energy band structure though they emit visible light rays. Consequently, the range of compositions capable of emitting visible light with a high quantum efficiency is evidently the region interposed between the straight lines AB and CD in FIG. 5. These straight lines can be expressed as $$y=-1.4x+0.45 \quad \text{(line AB)}$$
$$y=-0.9x+0.12 \quad \text{(line CD)}$$

In the above range, the compositions on the X- and Y-axes are within the composition range which has already been utilized as the GaAlAs type and GaPAs type mixed crystals.

Thus, the composition range which is effective in the present invention is $$\left.\begin{array}{c}-1.4x+0.45>y>-0.9x+0.12\\ 0<x<1,\ 0<y<1\end{array}\right\}$$

Figure 6:
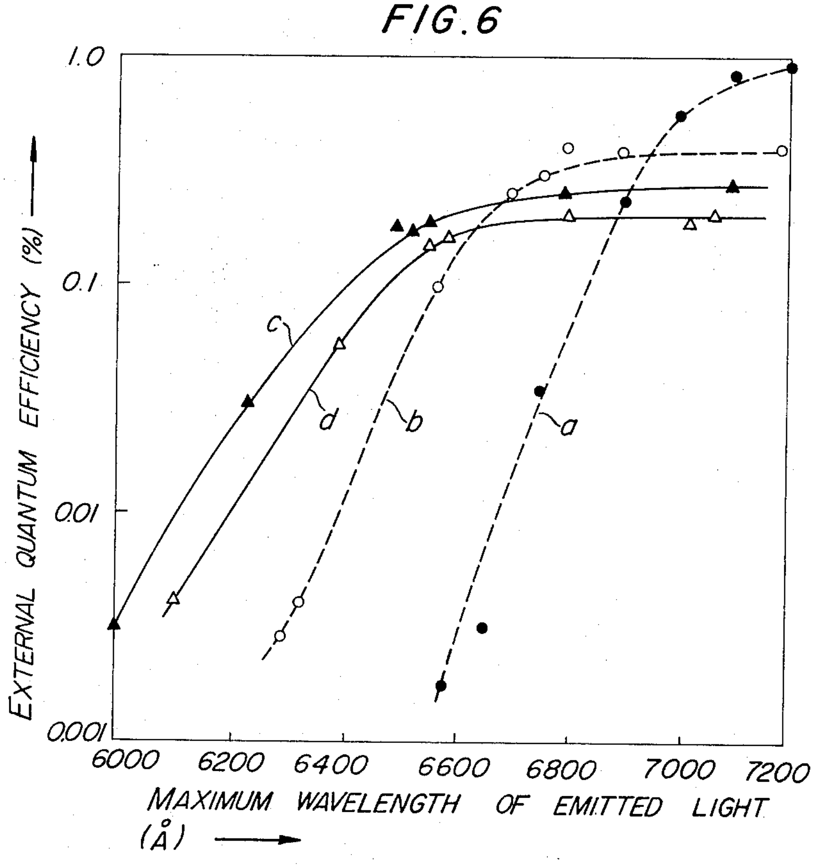
FIG. 6 is a graph showing a comparison between external quantum efficiency versus emitted light maximum intensity wavelength characteristics according to light emitting diodes according to the present invention and conventional light emitting diodes.

FIG. 6 shows a comparison between the quantum efficiency versus emitted light spectrum characteristics of the injection type light emitting elements according to the present invention and conventional ones. The curve $a$ represents the characteristic curve of a conventional $Ga_{1-x}Al_xAs$ type light emitting element, and the curve $b$ represents the characteristic of a conventional $GaAl_{1-x}P_x$ type light emitting element, while the curves $c$ and $d$ are the characteristics of $Ga_{1-x}Al_xAs_{1-y}P_y$ type light emitting elements according to the present invention. According to FIG. 6, the external quantum efficiency of the conventional light emitting element rapidly decreases when the maximum intensity wavelength of emitted light becomes shorter than 7000–6000 A., while the external quantum efficiency of the injection type light emitting element according to the present invention is only slightly reduced with the reduction of the wavelength, and hence the brightness of the light emitting element according to the present invention is very high. Moreover, since the number of parametric variables is two, i.e. $x$ and $y$, as compared with one in the conventional element, the degree of freedom of the composition of the element according to the present invention which can emit light of the some wavelength is larger than that of the conventional element. For example, the curves $c$ and $d$ in FIG. 6 are the plot of $y$ with $x$ being fixed at 0.1 and the plot of $x$ with $y$ being fixed at 0.1, respectively. Consequently, the injection type light emitting diode according to the present invention can emit red light which is nearer to the short wavelength and which has a higher visibility. Furthermore, according to the present invention it is easier to produce higher brightness elements and to produce based mixed crystals for the elements than the conventional elements of the $Ga_{1-x}Al_xAs$ and $GaAs_{1-x}P_x$ types.

What is claimed is:

1. An injection type light emitting element comprising a body of a direct energy band gap type compound semiconductor having the composition $Ga_{1-x}Al_xAs_{1-y}P_y$ within the quadrangle ABDC of FIG. 5, wherein lines AB and CD are defined by the equations $y=-1.4x+0.45$ and and $y=-0.9x+0.12$, respectively, and wherein $x>0$ and $y>0$, said composition having a maximum intensity wavelength shorter than about 7800 A. and a half-width less than about 700 A.

2. An injection type light emitting element according to claim 1, wherein $x=0.05$ and $y=0.25$.

3. An injection type light emitting element according to claim 1, wherein $x=0.1$ and $y=0.05$.

4. An injection type light emitting element according to claim 1, wherein $x=0.1$ and $y=0.1$.

5. An injection type light emitting element according to claim 1, wherein $x=0.2$ and $y=0.1$.

6. An injection type light emitting element according to claim 1, wherein $x=0.15$ and $y=0.20$.

7. An injection type light emitting element according to claim 1, wherein $x=0.1$ and $y=0.30$.

References Cited

UNITED STATES PATENTS 3,560,275 2/1971 Kressel et al. ........ 252—62.3

OTHER REFERENCES

Shih et al.: Liquid Phase Epitaxial Growth of $Al_xGa_{1-x}As_yP_{1-y}$—

IBM Technical Disclosure Bulletin, vol. 11, No. 12, May 1969.

OSCAR R. VERTIZ, Primary Examiner

J. COOPER, Assistant Examiner

U.S. Cl. X.R.

148—171, 172, 173; 317—235 N, 235 AP